Patented May 25, 1937

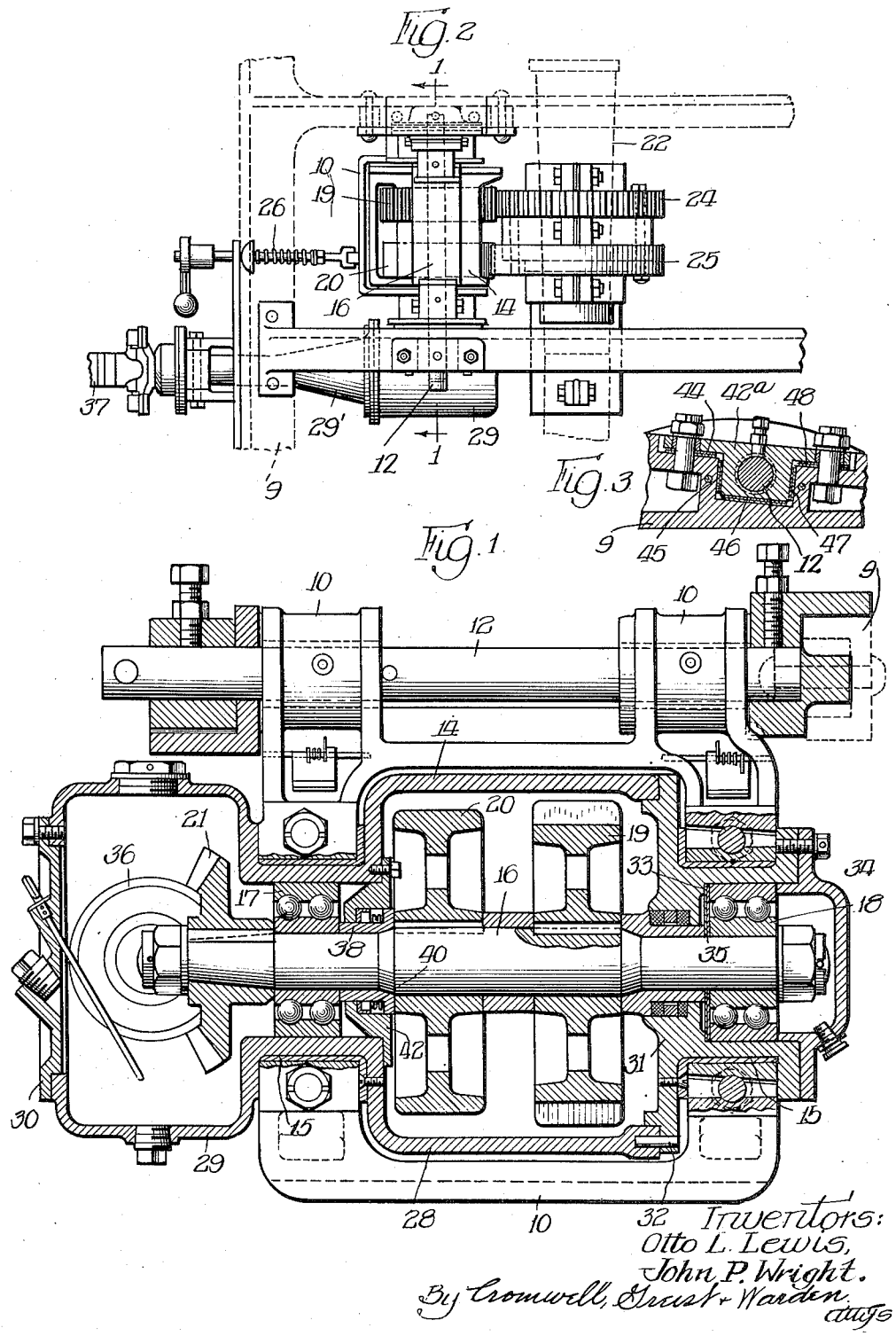

2,081,336

UNITED STATES PATENT OFFICE 2,081,336

DRIVING MECHANISM FOR RAILWAY CAR GENERATORS

Otto L. Lewis and John P. Wright, Chicago, Ill., assignors, by mesne assignments, to Foote Bros. Gear and Machine Corporation, Chicago, Ill., a corporation of Delaware Application June 19, 1935, Serial No. 27,337

4 Claims. (Cl. 105—109)

The present invention relates to driving mechanism for railway car generators and more particularly to an under car assembly for said mechanism.

The modern railway car is equipped not only with car lighting equipment but also with means for air conditioning the same. Generators for operating this equipment have a capacity up to 15 kw. and a great amount of power is required to operate them. Even in turning generators of a 10 kw. capacity or less for train lighting purposes alone it was found that the best results were obtained from a positive gear drive to the generator from the car axle.

Generator drives of this type must be able to withstand long periods of service without need for repair, and, if repairs are necessary after a certain mileage has accrued, the drives must be accessible for adjustment.

In the earlier drives, a driven pinion shaft was held in spring pressed relation adjacent a car wheel axle. A driving gear on the car axle meshed with a pinion on the driven shaft and they were held in mesh by a spring member but were prevented from harmful contact by cooperating distance or pitch drums on the two shafts adjacent the gears. At one end of the pinion shaft a beveled gear meshed with a second beveled gear on the generator shaft for rotating the same. The beveled gears were suitably housed and lubricated and the housing and encased beveled gears were suspended within a hanger frame pivotally mounted to the under structure of the car. One end of the pinion shaft was mounted in bearings in the hanger frame, and at the other end a portion of the beveled gear housing was likewise supported allowing the remainder of the casing to overhang the frame. This unequal distribution of weight was primarily carried by the pinion shaft and its bearings causing undue wear upon the pinion shaft hanger bearings and eventually destroyed the beveled gears because of the wabbling of the pinion shaft.

One object of this invention is to provide a driving mechanism for railway car generators that is rugged in construction, will withstand long and hard usage and yet be readily accessible for repair and adjustment.

Another object of this invention is to provide an improved mounting for a driven shaft in under car drives.

A further object of this invention is to provide a driven shaft for a generator drive that supports only its own weight and is subject only to wear and strains normally acquired by driven shafts.

A still further object of this invention is to provide a pinion shaft that is longitudinally adjustable for the correct meshing of the bevel gears and for wear through usage.

Still other and further objects of our invention will be pointed out or indicated hereinafter or will be apparent to one skilled in the art upon an understanding of the invention or its employment in practice.

For aiding in the disclosure of the invention, in the accompanying drawing forming a part of this specification is shown certain arrangements of mechanism by reference to which the article is described. It is to be understood that this description and drawing are presented for the purpose of illustration only and are not to be construed so as to limit the scope of the appended claims unnecessarily.

In the drawing:

Fig. 1 is a sectional view through a pinion shaft and its housing taken on line 1—1 of Fig. 2 showing the mounting of the same in a hanger frame;

Fig. 2 is a plan view of a portion of an under car structure showing the invention embodied therein; and Fig. 3 is a detailed view of a bearing block for supporting the hanger shaft.

To carry out the objects of the present invention an integral pinion shaft and beveled gear housing is supported within a hanger frame pivotally mounted on the under car structure. Within this housing, and adjacent each of its ends, a pinion or jack shaft is rotatably mounted. Upon one end of this shaft a beveled gear is mounted and is enclosed within said housing. Meshing with said bevel gear is a bevel gear on the generator drive shaft, said shaft being journaled and supported in a housing attached to the integral pinion shaft and beveled gear housing, thereby supporting the gears and shafts in one casing. By providing this casing for supporting both the pinion shaft and the bevel gears, the pinion shaft suffers no undue wear and the life of the beveled gears is considerably lengthened. Since the pinion shaft does not support the bevel gear case and beveled gears it may be mounted within its housing for longitudinal movement in adjusting the meshing of the beveled gears. Also, as it carries only its own weight it is easily removable from its housing.

With reference to the drawing a hanger frame member 10 is pivotally mounted upon a hanger shaft 12 and is provided with axially aligned openings therein for the support of a main case or housing 14. Hanger bearings 15 are inserted within these openings between the hanger member 10 and the main housing 14. A pinion or jack shaft 16 extends through and is rotatably mounted within this housing adjacent each end in the bearings 17 and 18 respectively. This driven shaft 16 carries upon it the spur pinion 19, a pitch drum 20 and, at one end a beveled gear member 21.

This whole assembly so far described is disposed adjacent a car axle 22 acting as a drive shaft and having thereon a gear wheel 24 and a distance or pitch drum 25 for engagement with the spur pinion 19 and pitch drum 20 of the driven shaft, respectively. A strong spring member 26 presses the hanger frame and its assembly towards the car axle 22 so that the pinions 19 and 24 are in continual engagement. The pitch drums 20 and 25 prevent a harmful or locking engagement therebetween and act as contact limiting means in this regard.

While the main housing extends the entire length of, and forms a supporting means for, the pinion shaft 16, it is open on the side adjacent the car axle gear wheel and drums so that the gears and drums of the drive and pinion shaft may form an operable contact.

The main housing 14 is narrow at its place of suspension in the hanger bearings 15 and broadens out to form the pinion housing 28 between the bearings and open as above described, and a closed and oil-tight beveled gear casing 29 overhanging the frame member 10. The gear casing has the cover 30 suitably held in place by bolts and the pinion housing 28 has the main housing cover 31 held in place upon the main housing by cap screws and dowel pins 32. Upon the removal of the main case cover 31, and after removal of the beveled gear 21, the entire jack shaft assembly may be pulled out of the housing 14. The bearing 18 is actually mounted within the housing cover 31 and is held in place against a shoulder 33 by the bearing retainer and end cap 34 bolted to the cover 31. By inserting variously sized shims 35 between the shoulder 33 and the bearing 18, the jack or pinion shaft 16 may be moved longitudinally of its axis and the beveled gear 21 adjusted with relation to its cooperating beveled gear 36 on the generator drive 37.

In order to make the gear casing 29 oil tight an oil seal collar 38 is mounted upon the pinion shaft on the main housing side of the bearing and an oil seal 40 is inserted thereagainst and is held in position by the oil seal retainer ring 42.

In earlier forms the beveled gear housing 29 terminated adjacent the pitch drum 20 and the pinion shaft 16 at the end opposite the beveled gear was mounted directly in ball bearings in the hanger frame 10. The added weight upon the beveled gear end of the pinion shaft quickly wore down the hanger bearing 15 adjacent thereto. Wear on the hanger bearing at this point soon destroyed the bearing 17 and permitted the pinion shaft to wabble, wearing out the beveled gears 21 and 36. By the present invention the pinion shaft is supported at both ends within the housing 14 which in turn is supported within the hanger 10. There is no uneven wear on either of the hanger bearings 15 and consequently the entire assembly gives much longer service.

As shown in detail in Fig. 3, the hanger shaft 12 is mounted on a truck frame 9 by an adjustable bearing block assembly which permits alignment of the jack shaft 16 with the car axle 22. The bearing block 42a is T-shaped and has surrounding it a plurality of shims 44, 45, 46, 47 and 48, so that the block may be moved laterally or horizontally merely by removing appropriate shims in order to obtain accurate alignment with the car axle. This feature is of considerable importance, as when the unit is applied in different axle constructions they are not always in exact alignment with the frame and likewise, when the axle assembly is changed after the unit has been once installed, it is necessary that it can be adjusted both laterally and vertically to give accurate alignment. Otherwise, the gears and the pitch drums will be unevenly worn and the unit's useful life will be greatly shortened.

We claim:

1. In an under car drive mechanism, a supporting structure, a hanger frame pivotally mounted thereon, said hanger frame having spaced leg members, a rigid partially open housing mounted on said frame between said leg members and having a portion of said housing overhanging the frame, bearing members mounted in said housing in the proximity of said leg members, a driven shaft rotatably mounted within said housing in said bearing members and extending into said overhung portion, said driven shaft having a pinion mounted thereon within said partially opened housing, a drive shaft disposed adjacent said housing, said drive shaft having a gear member mounted thereon for cooperation with said pinion through said partially open housing, a propeller shaft and gear means mounted within said overhung gear casing for driving said propeller shaft from said driven shaft.

2. In an under car drive mechanism, a supporting structure, a hanger frame pivotally mounted thereon, said hanger frame having spaced leg members, a partially open rigid housing member on said frame and having a portion of said housing overhanging the frame, an oil-tight beveled gear casing integral with said housing, bearings in said housing member positioned in the proximity of said leg members, a driven shaft rotatably mounted within said housing in said bearing members and extending into said beveled gear casing, said driven shaft having a pinion mounted thereon within said partially open portion of said housing, a drive shaft disposed adjacent said housing, said drive shaft having a gear member mounted thereon for cooperation with said pinion through the partially open portion of said housing, a propeller shaft and gear means mounted within said gear casing for driving said propeller shaft from said driven shaft.

3. In an under car mechanism, a supporting structure, a hanger frame pivotally mounted thereon, a partially opened housing member on said frame and having a portion of said housing overhanging the frame, said housing having one end thereof removable, and a beveled gear casing formed integral with the other end thereof, a driven shaft journaled in bearings in said removable end portion and said other end portion of said housing, and sealing members for sealing said bearings from the open portion of said housing, a pinion mounted on said driven shaft within said partially opened portion of said housing, a drive shaft disposed adjacent said housing, said drive shaft having a gear member mounted thereon for cooperation with said pinion through the partially opened portion of said housing, a propeller shaft and gear means mounted within said gear casing for driving said propeller shaft from said driven shaft.

4. In an under car drive mechanism, a supporting structure, a hanger frame pivotally mounted thereon, a partially opened housing member on said frame and having a portion thereof overhanging said frame, one end of said housing being removable and the other end thereof having formed integral therewith a beveled gear casing, a driven shaft journaled in bearings mounted in said removable end portion and in said other end portion of said housing, sealing means for sealing said bearing in the removable end portion of said housing, means for adjusting said shaft axially, and a pinion mounted on said shaft within said partially opened portion of said housing, a drive shaft disposed adjacent said housing, said drive shaft having a gear member mounted thereon for cooperation with said pinion through the partially open portion of said housing, and a generator drive shaft having one end thereof journaled in said beveled gear casing, and beveled gears mounted on said driven shaft and said generator drive shaft for actuating the latter.

OTTO L. LEWIS.
JOHN P. WRIGHT.